United States Patent [19]
Betts

[11] Patent Number: 4,734,920
[45] Date of Patent: Mar. 29, 1988

[54] HIGH SPEED MODEM FOR MULTIPLE COMMUNICATION CIRCUITS

[75] Inventor: William L. Betts, St. Petersburg, Fla.

[73] Assignee: Paradyne Corporation, Largo, Fla.

[21] Appl. No.: 659,287

[22] Filed: Oct. 10, 1984

[51] Int. Cl.$^4$ .............................. H04B 1/38
[52] U.S. Cl. ............................ 375/8; 375/38
[58] Field of Search ............. 375/38, 39, 118, 13, 375/122, 8, 100; 455/59, 65, 139; 371/1; 370/108, 109, 118

[56] References Cited

U.S. PATENT DOCUMENTS

| | | | |
|---|---|---|---|
| 3,304,500 | 2/1967 | Likel | 375/38 |
| 3,311,442 | 3/1967 | Jager et al. | 455/59 |
| 3,343,093 | 9/1967 | Gerwen | 375/38 |
| 3,588,702 | 6/1971 | Tisi | 375/39 |
| 3,701,852 | 10/1972 | Sluijter et al. | 375/38 |
| 3,955,141 | 5/1976 | Lyon et al. | 375/39 |
| 4,355,397 | 10/1982 | Stuart | 375/39 |
| 4,520,483 | 5/1985 | Arita et al. | 375/118 |

Primary Examiner—Robert L. Griffin
Assistant Examiner—Marianne Huseman
Attorney, Agent, or Firm—Kane, Dalsimer, Sullivan, Kurucz, Levy, Eisele and Richard

[57] ABSTRACT

An apparatus and method are disclosed for transmitting a single high speed bit stream over several low-speed channels. The high-rate bit stream is separated into several low rate bit streams which are modulated and transmitted over individual data channels. At the receiving end the relative time legs of the channels are determined and the signals from the data channels are delayed to insure that they are demodulated simultaneously. The demodulated signals are then combined into a single high-rate output bit stream. All signal processing takes place in a single modem at each end adapted to handle the several channels simultaneously and to determine the differential delay therebetween.

7 Claims, 2 Drawing Figures

HIGH SPEED MODEM FOR MULTIPLE COMMUNICATION CIRCUITS

RELATED DISCLOSURES

This disclosure is related to my copending application entitled "Digital Modem For Multiple Telephones", Ser. No. 580,672 filed Feb. 16, 1984; and "Device for Synchronization of Multiple Telephone Circuits" Ser. No. 659,289, filed Oct. 10, 1984 and incorporated herein by reference.

BACKGROUND OF THE INVENTION

1. Field of Invention

This invention pertains to a method and device of transmitting digital information at a high data rate over several relatively low data rate communication channels.

2. Description of the Prior Art

It is known that the rate of data communication over leased data channels is limited by the maximum speed of said channels and the modems used to interface with the channels. In order to overcome this barrier an LSD (Line Sharing Device) has been used. This device, also known as an N-plexer, receives data bits at a high rate from a DTE (Data Transmitting Equipment) and distributes these data bits to several modems which operate at a lower bit rate than the bit rate of the DTE. Each modem encodes its share of the bits into corresponding analog signals, which then are transmitted over leased data channels. At the receiving end several modems, one per channel, are used to demodulate the signals and a second LSD is used to re-assemble the low speed demodulated signals into a single high speed bit stream.

However this scheme requires the use of several complete modems in addition to the LSD. Furthermore complications arise if several different types of data channels are used simultaneously because they could introduce delays in the system.

OBJECTIVES AND SUMMARY OF THE INVENTION

In view of the disadvantages outlined above, it is an objective of the present invention to provide a single modem which could be used to transmit a single high rate bit stream over several low-rate data channels.

A further objective is to provide a system adapted to handle several types of communication channels by automatically adjusting to their different time delays.

Another objective is to provide a system with a single modem at each end to provide cost, space and energy savings.

Other advantages and objectives shall become apparent in the following description of the invention.

According to this invention, the data bits received over several different channels are sent to a single modem which is adapted to determine the differential delay, if any, between the different streams and to adjust their decoding accordingly so that they can be recombined properly in a single high speed bit stream.

DESCRIPTION OF THE PREFERRED EMBODIMENT

Figure 1:
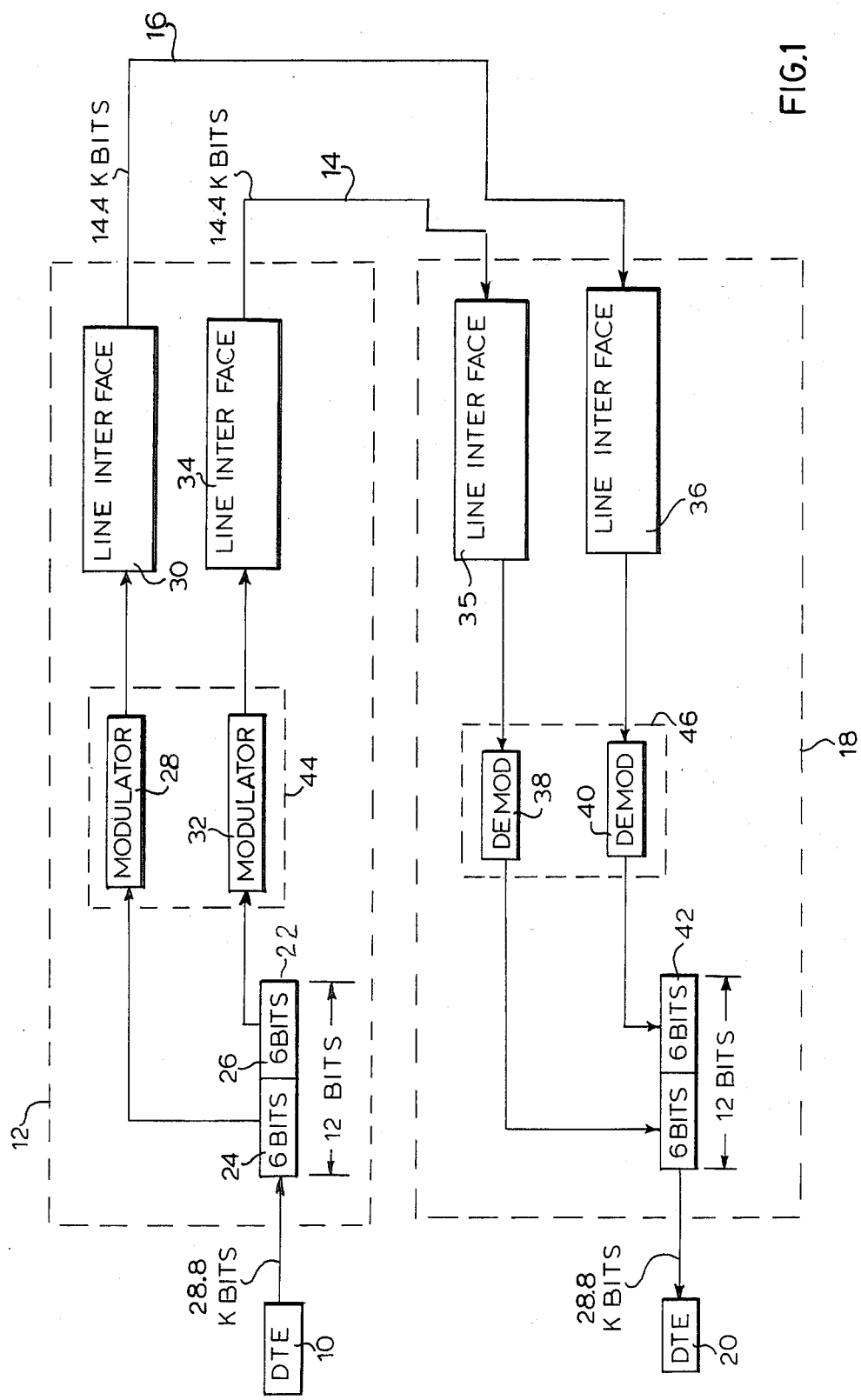
FIG. 1 shows two modems interconnected by two data channels in accordance with the present invention.

The present invention is best explained in conjunction with FIG. 1. In this Figure DTE 10 sends data to a modem 12 at a high rate such as 28.8 kilobit/sec. The modem 12 is connected to two 14.4 kbit/sec. voice bandwidth data channels 14 and 16 for transmitting data signals to a second modem 18. This second modem demodulates the data from the two channels and recombines it into a single 28.8 kbit/sec. stream which is sent to a second DTE 20.

Within modem 12, the data received from DTE 10 is fed serially into a 12 bit register 22 with parallel-output capability. The contents of the left half 24 of the register 22 are fed into a first modulator 28 which modulates each 6 bits into corresponding 14.4 k bit/sec., 2.4 k baud signals. These signals are transferred to data channel 16 by line interface circuit 30. Similarly the contents of the right half 26 of register 22 are processed by modulator 32 and transferred to channel 14 by line interface circuit 34.

At the receiving modem 18 analog signals from channels 14 and 16 are transferred by line interface circuits 35 and 36 to two demodulators 38 and 40 respectively which process said data. The resulting binary data is fed from demodulators 38 and 40 to the left and right halves, respectively, of a twelve bit register 42. From register 42 bits are serially sent to DTE 20 at 28.8 kbit/sec.

In the above mentioned commonly assigned copending application Ser. No. 580,672 filed on Feb. 16, 1984, I have disclosed a modem for exchanging data between several DTE's and several communication channels. Briefly the invention therein takes advantage of a microprocessor's ability to handle the data between the several DTE's and the corresponding data channels within a single duty cycle, whereby each DTE and data channel pair is serviced sequentially within said cycle. The same concept is utilized in this invention. Thus, while two separate modulators 28, and 32 and demodulators 38 and 40 are shown in FIG. 1, it should be understood that a single microprocessor (indicated by numerals 44 in modem 12, and 46 in modem 18) is used to perform the functions of these elements.

The two channels, 14, 16 are shown as paralleling each other so that theoretically the data transmission along these channels occurs simultaneously and, thus, for example, a symbol A and a symbol B representing 12 bits of data received from DTE 10, which is sent simultaneously from modem 12 over channels 14 and 16 respectively, should arrive at modem 18 at exactly the same time so that the corresponding demodulated bits are assembled correctly by register 42. However in actuality the channels are not under the control of the user but are leased from telephone companies which normally do not guarantee that the transmission over any two channels will be identical. Typically a leased data channel may comprise telephone lines connecting the customer to the local telephone company center. Signals between telephone centers may be exchanged in any number of ways ranging from overhead wires to wireless radio cummunications through ground-based relaying stations or satellites. Therefore the time necessary for data signals to go from one data terminal location to another is a function of the actual routing taken by the signals. As mentioned before, the two channels leased at any given time may not follow the same route and therefore the transit time on the two channels may differ. However it is enough if one of the channels lags behind the other by only one baud to render the output to the receiving DTE meaningless. Therefore means are provided for detecting the difference in transit times and for delaying the bauds from the faster channel until they coincide with the bauds from the slower channels.

Figure 2:
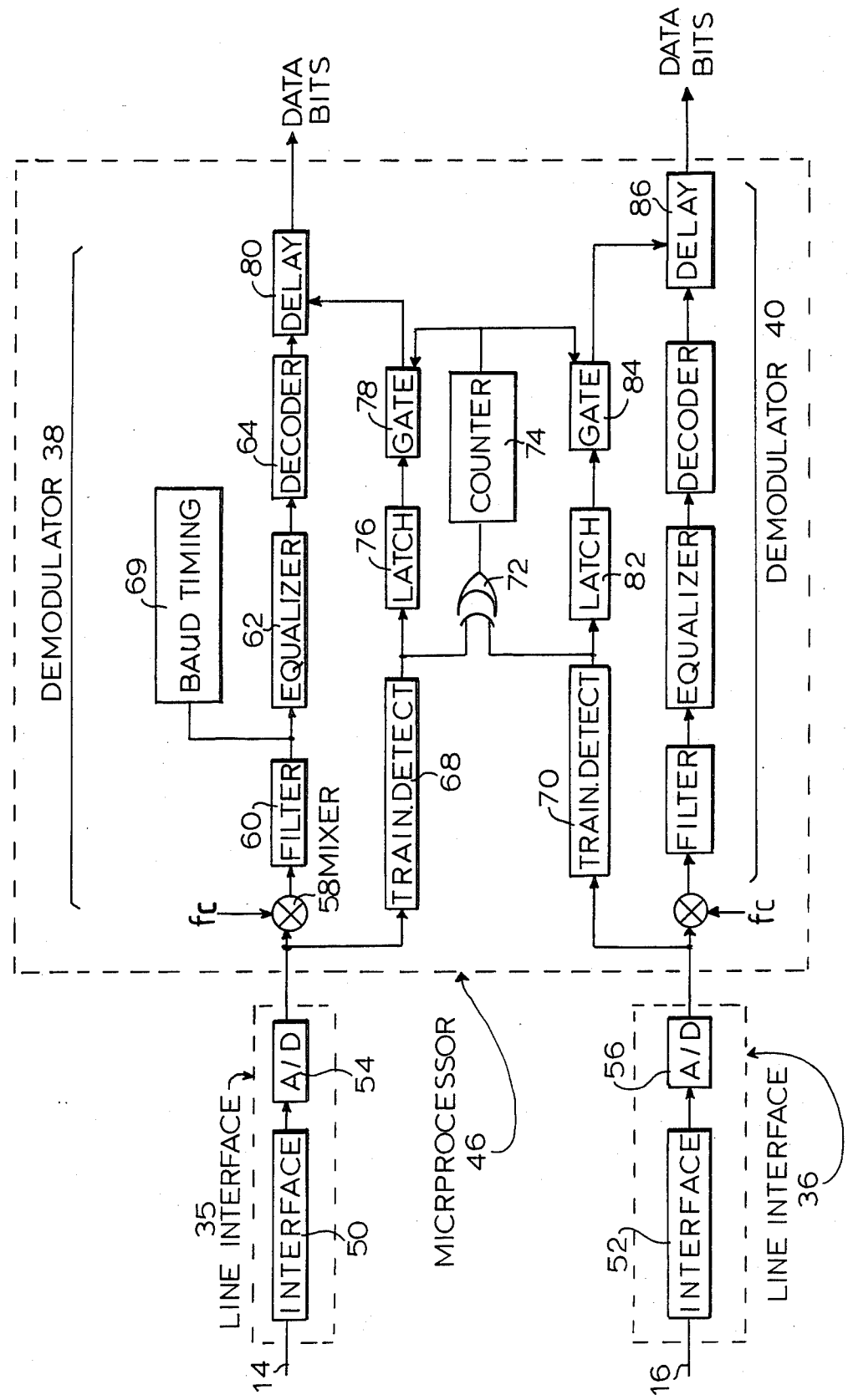
FIG. 2 shows details of the two modems incorporating variable delay means.

One method of implementing this delaying feature is shown in FIG. 2. The line interface circuits 30, 34 are adapted to convert time-sampled digitized signals from the microprocessor 44 into analog signals. Line interface circuits 35, 36 are adapted to convert analog circuits received from the data channels into time-sampled digitized signals for microprocessor 46. The interface circuits comprise interface networks 50, 52 and A/D converters 54, 56. Each interface network has adaptive equalizers with equalizing coefficients which may be changed dynamically by the microprocessor 46 during the operation of the modem. The equalizing coefficients are set during the training period of the modem which is part of the normal power-up routine of each modem, and which normally precedes actual data transmission.

The signals from interface network 50 are converted by A/D converter 54. The digitized signals from this converter 50 are demodulated by demodulator 38 which comprises a mixer 58, a low pass filter 60, equalizer 62, decoder 64 and delay 80. The digitized signals are multiplied in 58 by the carrier frequency fc and then low pass filtered to eliminate the harmonics. After equalization by equalizer 62, the signals are then sent to decoder 64 which generates a stream of binary bits corresponding to the received signals in accordance to the particular coding scheme used in the system. Baud timing is detected by circuit 69. The signals from line 16 go through a similar set of circuits as shown in FIG. 2. Note that baud timing is recovered on only one of the channels taking advantage of the common base from DTE 10. Therefore the complexity of demodulator 40 is reduced.

In order to determine the differential delay between the two channels the signals from the two A/D converters 54, 56 are fed to two detector circuits 68, 70 respectively. These circuits are provided to detect training signals on the corresponding channels. As soon as one of the detect circuits, such as 68 detects the presence of training signals on its channel, i.e. channel 14, it sends an enabling signal through an exclusive-OR gate 72 to counter 74. Simultaneously training detector 68 also enables a latch 76 provided to indicate that the first signals have been received on channel 14. The counter 74 is incremented during each baud period as determined by baud timing circuit 69 until the other training detector circuit 70 detects signals on the second channel 16.

A signal from training detector 70 disables exclusive-OR gate 72 thereby terminating the count. Thus counter 74 now contains the differential delay between the two channels 14, 16 in baud periods. This number is provided through gate 78 to a variable delay circuit 80. Gate 78 is enabled by latch 76. Delay circuit 80 is adapted to delay the bit stream generated by decoder 64 by a time period which is equivalent to the baud count received from counter 74. If no signal is received the counter then delay 80 merely passes through the received bits without any delay. Latch 82, gate 84 and delay circuit 86 are provided to perform similar functions for channel 16 as their counterparts for channel 14 when train signals are detected first on channel 16 instead of channel 14.

The operation of the invention is evident from the above description. When the training signals are received from channels 14 and 16, the differential delay between the two channels is determined by counter 74. Also latch 76 is enabled if signals are first detected on channel 14 and latch 82 is enabled if signals are first detected on channel 16. This differential delay is used to delay the data bits on the appropriate channel so that the bits received on the two channels can be properly recombined as described above.

It should be appreciated that by determining the delay differential during the training period it is insured that the demodulators for the two channels are properly set by the time the data signals arrive. The differential delay is measured using the train traiming detect functions 68, 70 which are required in all modems having adaptive equalizers. The complexity of the modem is reduced since a redundant means for differential delay measurement is not required.

In FIG. 2 delay circuits 80, 86 are shown as placed after the respective decoder to minimize the number of bits that have to be delayed. Alternatively the delay circuits could be placed between the appropriate filters and equalizers. In this configuration the equalizers perform their functions simultaneously on both channels. However the number of bits which must be processed by each delay circuit has been increased typically from 6 to 24.

While only the signal path from DTE 10 to DTE 20 has been described, it should be understood that the system operates in the identical fashion in the reverse direction.

Furthermore while the invention has been described in conjunction with only two channels it is obvious that one skilled in the art could easily extend it to cover a larger number of channels depending on the ratio between the DTE data rate and channel capacity. Thus this and other modifications may be made to the subject invention without departing from its scope as defined in the appended claims.

I claim:

1. A modem for generating a high speed digital bit stream corresponding to signals received over a first and second data channel comprising:
   first means for detecting first signals from said first data channel;
   second means for detecting second signals from said second data channel;
   means having two inputs connected to respective outputs of said first and second detecting means for determining the time difference between said first and second signals and generating a signal representative of said time difference;
   means for automatically delaying one of said first and second signals in accordance with said signal representative of said time difference whereby said first and second signals arrive at a shift register simultaneously and wherein said shift register, one half of which is connected to a first output of said means for automatically delaying and another half of which is connected to a second output of said means for automatically delaying, combines said first and second signals to form a single bit stream and wherein said first and second means for detecting signals each comprise adaptive equalizers whose equalizing coefficients are set during a training period of the modem precedes actual data transmission.

2. A system for exchanging high speed data signals over two low speed data channels comprising:
   a. transmitter means coupled to said data channels for receiving a high speed data stream from data transmission equipment and including:
      1. partitioning means for partitioning said high speed data stream into a first and a second low speed data stream;
      2. A first modulator section coupled to said partitioning means for generating a first stream of modulated signals corresponding to said first low speed data stream for transmission over said first channel; and
      3. a second modulator section coupled to said partitioning means for generating a second stream of modulated signals corresponding to said second low speed data stream, for transmission over said second channel; and
   b. receiver means coupled to said data channels for receiving said first and second streams of modulation signals and including:
      1. a first demodulator for generating a first output data stream corresponding to said first stream of modulated signals;
      2. a second demodulator for generating a second output data stream corresponding to said second stream of modulated signals;
      3. said first and second demodulators comprising delay detecting means for detecting a differential delay between said first and second streams of modulated signals, and comprising automatic delay means for causing one of said first and second streams of modulated signals to be delayed in accordance with said delay; and
      4. combining means for generating a combined output data stream from said first and second output data streams and wherein said first and second streams of modulated signals are preceded by first and second training signals on the corresponding channels, and wherein said first demodulator further comprises a first training detector for detecting said first training signals; said second demodulator further comprises a second training detector for detecting said second training signals; and said delay detecting means is coupled to the outputs of said first and second training detectors for detecting said differential delay.

3. The system of claim 2 wherein said delay detection means comprises a counter which is activated when training signals are detected by one of said training detectors, and is deactivated when training signals are detected by the other of said traiining detectors, said counter generating a count signal corresponding to said differential delay.

4. The system of claim 3 wherein said delay detector means comprises a first latch which is activated when said first training signals are detected first; and a second latch which is activated when said second training signals are detected first.

5. The system of claim 3 wherein said delay means comprises a first variable delay circuit for delaying said first output data stream in accordance with said count signal when said first latch is activated; and a second variable delay circuit for delaying said second output data stream in accordance with said count signal when said second latch is activated.

6. The system of claim 2 wherein said partitioning means comprises a serial-in/parallel-out shift register having a first register half coupled to said first modulator and a second register half coupled to said second modulator.

7. The system of claim 2 wherein said combining means comprises a parallel-input/serial output shift register with a first half coupled to said first demodulator and a second half coupled to said second demodulator.

* * * * *